May 21, 1968

W. C. WEHNER 3,384,398

BALL JOINT

Filed Jan. 12, 1966

INVENTOR
WILLIAM C. WEHNER

BY Burton & Parker

ATTORNEYS

May 21, 1968

W. C. WEHNER 3,384,398

BALL JOINT

Filed Jan. 12, 1966

INVENTOR
WILLIAM C. WEHNER
BY
*Burton E. Parker*
ATTORNEYS

May 21, 1968 W. C. WEHNER 3,384,398
BALL JOINT
Filed Jan. 12, 1966 3 Sheets-Sheet 3
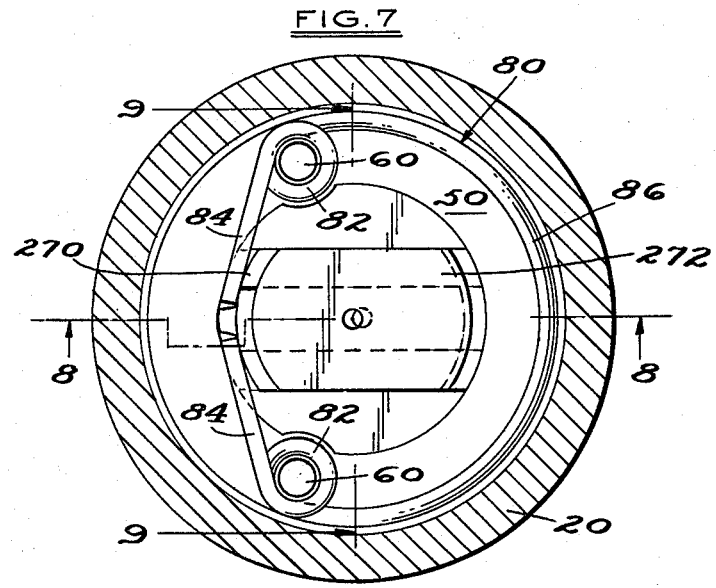
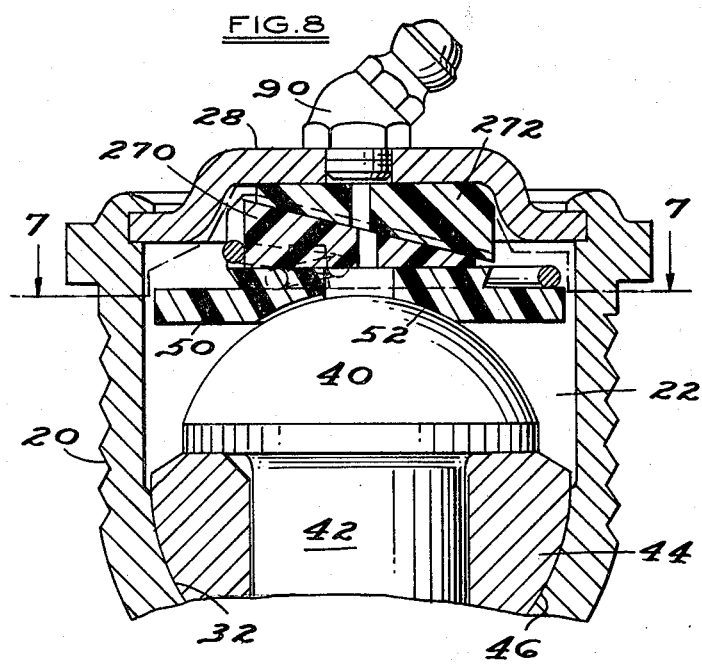
INVENTOR
WILLIAM C. WEHNER
BY
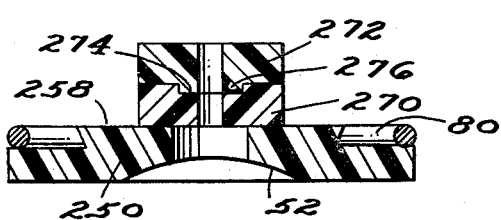
ATTORNEYS

United States Patent Office 3,384,398
Patented May 21, 1968

3,384,398
BALL JOINT
William C. Wehner, Detroit, Mich., assignor to Moog Industries, Inc., St. Louis, Mo., a corporation of Missouri
Filed Jan. 12, 1966, Ser. No. 535,629
9 Claims. (Cl. 287—90)

This invention relates to improvements in self-adjusting swivel joints, having particular though not exclusive utility in ball joints of the tension loaded type employed in automotive wheel suspension systems.

In a tension loaded ball joint the primary loading tends to pull the ball stud out of the housing against the primary bearing surface. In compression loaded ball joints, the primary loading tends to force the ball member head into the housing socket against the opposed primary bearing surface. The ball joints in an automotive suspension system support the weight of the vehicle, and may be either of the tension or compression loaded type, and many systems employ both types of joints.

The ball joints of an automotive suspension system are subjected to forces which tend to lift the ball members from their primary bearing surfaces. Such forces occur during acceleration and deceleration of the vehicle, and during cornering. These forces may also result from road shocks and vibration. Conventional automotive ball joints are designed with clearances between the ball member head and the opposed bearing surfaces. These clearances will increase with wear. Thus, the ball head will repeatedly impact against the opposed bearing surfaces, as the ball head is lifted from its primary bearing surfaces, and is driven back by the weight of the vehicle against the primary bearing surface. This impact loading develops large forces, which increase with wear, until the ball joint is literally pounded apart.

The proposed solution to this problem is basically similar for the tension or compression loaded ball joint. The ball joint must be automatically adjusted to continuously and "nonreversibly" urge the ball head against its primary bearing surface. By "nonreversibly," I mean that the ball head must be maintained against its primary bearing surface during the reverse loading described hereinabove. However, because the functional requirements of the tension and the compression loaded ball joints are quite different, as described above, the structural embodiments required to achieve this result must also be different.

Another problem has been to design an automatically adjustable ball joint that does not require a substantial increase in size over the conventional ball joints, and which is interchangeable with conventional ball joint systems. A substantial increase in size would result in additional expense, and might require redesign of the suspension system. Further, to be commercially acceptable, an automatically adjustable ball joint must not require any substantial increase in cost over the conventional nonadjustable or manually adjustable ball joints.

An object of this invention is therefore to provide a tension loaded ball joint which automatically maintains a zero clearance between the ball head and the axially related load bearing surfaces, while retaining the requisite freedom of movement, thus eliminating the need for manual adjustment.

Another object is to provide an automatically adjustable tension loaded ball joint suitable for use in automotive wheel suspension systems, which eliminates the need for service, and which is comparable in cost to conventional nonadjustable and manually adjustable ball joints.

Another object of this invention is to provide a ball joint which is interchangeable with conventional ball joint systems, with an automatically operable wear takeup unit, and to provide simple means for sealing the assembly so that foreign matter is excluded from the interior working portions of the unit.

Another object is to provide a tension loaded ball joint which automatically compensates for misalignment between the ball stud and the related bearing elements.

Another object of this invention is to provide an automatically adjustable ball joint wherein the spring tensioning means is an improvement over conventional coil spring systems.

Other objects, advantages and meritorious features will more fully appear from the specification, claims and accompanying drawings, wherein:

FIG. 7 is a cross-sectional view of another embodiment of my invention shown in FIG. 8 in the direction of view arrows 7—7;

FIG. 8 is a cross-sectional view of FIG. 7 in the direction of view arrows 8—8; and FIG. 9 is a cross-sectional view of the wedge bearing means shown in FIG. 7 in the direction of view arrows 9—9.

Figure 1:
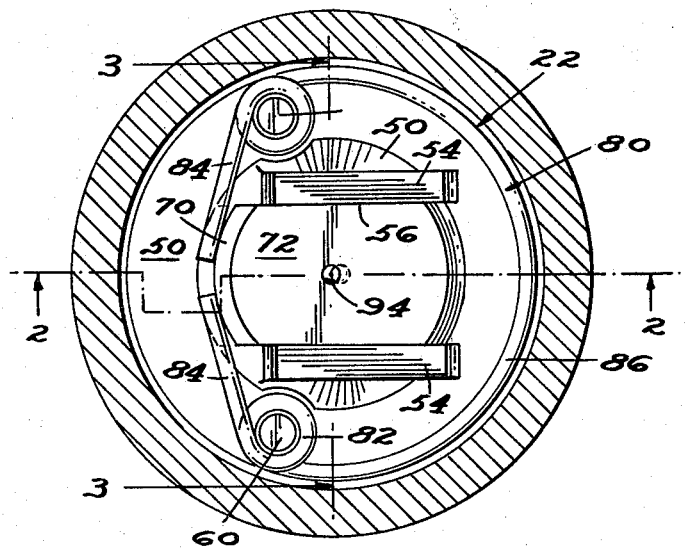
FIG. 1 is a top elevation, with the cover removed, of one embodiment of my invention.

The embodiments of my invention illustrated and described herein have certain common features and elements which may be described generally prior to the detailed description which follows. Each embodiment has a housing which defines a socket having a substantially cylindrical opening at one end, and a restricted opening at the opposite end. The cylindrical opening of the socket is sealed with a cover which may be spun in place as shown. The restricted opening of the socket is provided with an adjacent spherical bearing surface which is subjected to the primary loading of the stud. The enlarged head of the stud may be provided with a spherical annular bearing as shown, or a more conventional unitary ball head which bears against the primary bearing surface of the housing.

The illustrated embodiments of the housing and the stud should not be construed to limit the inventive concepts of this invention, as any suitable conventional housing and stud may be utilized. Similarly, the material of the housing and the stud may be conventional. For example, the separate spherical housing of the stud may be a compressed sintered metal alloy, or other conventional bearing material.

A "floating" bearing element is located within the housing socket opposite the open end, which is provided with a spherically concave bearing surface which is continuously and "nonreversibly" urged into bearing engagement with the stud enlarged head opposite the stud shank portion.

The enlarged spherical head of the stud is normally retained against the primary bearing surface by the mass of the vehicle, and the tilting of the ball stud causes wear of the bearing surface and the ball head. Another factor to be considered in the design of an automatically adjustable ball joint, is that neither the stud head nor the bearing surface will be perfectly spherical, and the mating surfaces will therefore seldom if ever be identical. The irregularities in the surfaces may cause galling or locking of the stud head, and prevent the freedom of tilting required for a smooth acting ball joint.

Many solutions to these problems have been proposed by the prior art, including the use of a resilient material, such as Teflon or rubber, for the bearing material. However, these solutions while solving the problem of the ball stud galling, create a more serious problem termed "backlash." A resilient material will yield under shock loading, momentarily increasing the clearance between the opposed bearing surfaces, allowing the ball member to axially shift within the socket and repeatedly impact the bearing surfaces during reverse loading, or "backlash."

I have solved this problem without the use of a resilient bearing material by employing a bearing system wherein the secondary bearing element is free to "float" laterally to compensate for misalignment, and is continuously and nonreversibly urged against the stud head to maintain the bearing engagement between the stud head and the primary bearing surface. A "zero clearance" is thereby maintained with substantially rigid bearing materials.

The upper or secondary bearing is therefore made of a relatively nonresilient material which will cold flow under the contemplated range of forces built into the ball joint, but which will not deform under shock or impact loading such as described hereinabove. The ability of the secondary bearing to cold flow under compressive force allows the bearing to compensate for dimensional tolerances inherent in the bearing and the stud head, while maintaining the requisite tightness for "zero clearance" conditions. This bearing should also be capable of absorbing metal particles resulting from wear of the stud member and the bearing surfaces. A cold flowable material will deform to accept these particles without sacrificing its bearing capacity. A bearing material which meets these requirements is a hard thermoplastic resin, such as the family of acetal resins. An example of this material is Du Pont Delrin, however other suitable materials may be used, such as nylon or other thermoplastic resinous materials. The secondary bearing may also be metallic, however, the secondary bearing is preferably not of the same material as the wedge-shaped members that bear thereagainst to prevent "freezing" of the mating surfaces.

Figure 4:
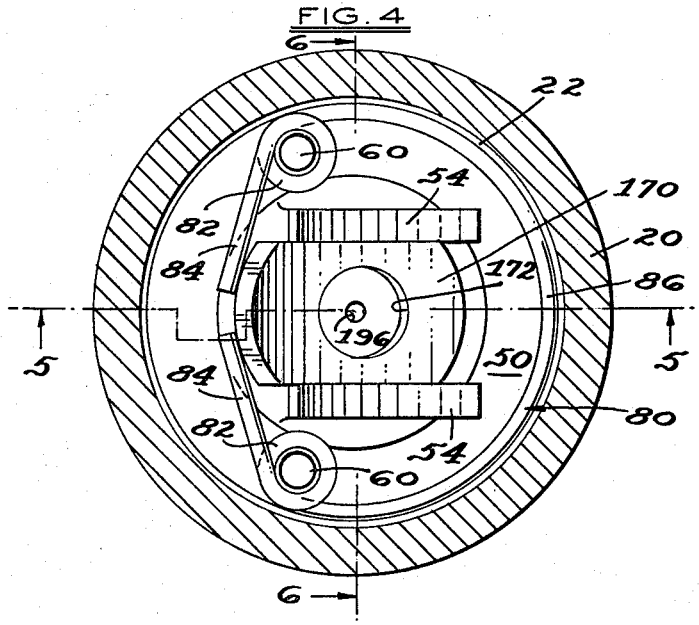
FIG. 4 is a top elevation cross section of another embodiment of my invention, as shown in FIG. 5 in the direction of view arrows 4—4.
Figure 5:
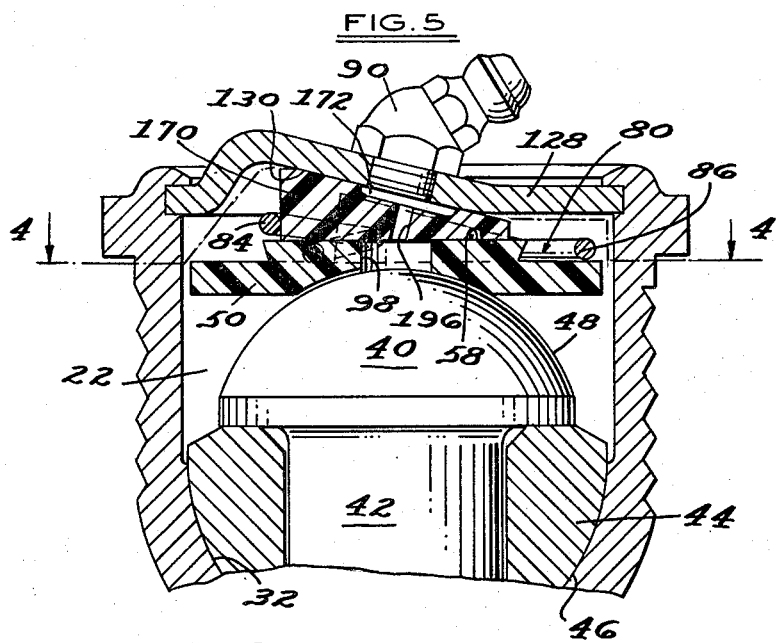
FIG. 5 is a cross-sectional view of FIG. 4 in the direction of view arrows 5—5.
Figure 6:
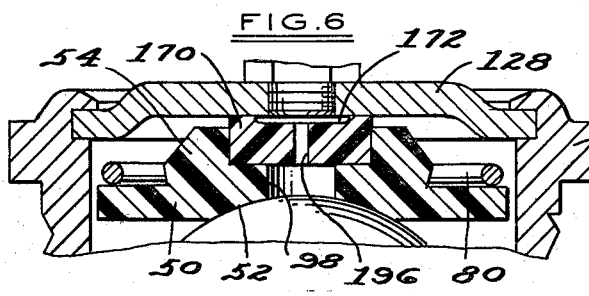
FIG. 6 is a partial cross-sectional view of FIG. 4 in the direction of view arrows 6—6.

The secondary bearing is urged against the stud head by a wedge means and a novel spring system. The wedge means comprises a pair of wedge-shaped members as shown in FIGS. 1 to 3 and FIGS. 7 to 9, or a single wedge member which reacts against an inclined surface of the housing cover as shown in FIGS. 4 to 6. In each embodiment illustrated a wedge member is shifted by the spring means on a planar surface of the "floating" secondary bearing, substantially perpendicular to the axis of the stud shank, against an inclined face of either a second stationary wedge member or the housing cover.

The wedge members may be formed of any suitable material. The wedge members are preferably substantially rigid, for the same reason as given for the bearings, and should be made from a friction-resistant material which will wedgingly shift between the floating bearing surface and the opposed inclined surface. Materials which meet these requirements are the acetal resins described hereinabove, and the family of rigid nylon resin molding compounds, such as molded Du Pont Zytel. Thus, the shiftable wedge member might be a nylon resin molding compound, and the stationary wedge member, when utilized, might be an acetal resin material. This would prevent the bearing of surfaces of the same material, and prevent "freezing." The spring means illustrated comprises a pair of balanced single coil torsion springs, which are joined to provide a highly efficient inexpensive spring system. The spring may be formed of any suitable material, for example music wire.

The coils of the torsion spring are received on posts defined on the floating secondary bearing, which allows the entire "wedge bearing" to float within the housing to automatically correct for misalignment of the related elements.

An important common feature of the illustrated embodiments of my invention is the continuous and "nonreversible" urging of the stud head substantially in the axis of the stud against the primary bearing surface. As stated herein, the tilting of the stud head, under the weight of the vehicle, causes wear, and it can be seen upon examination of the drawings that this wear will primarily occur substantially in the axis of the stud. Therefore, a self-adjusting ball joint should react to urge the enlarged stud head substantially in the axis of the stud if it is to be effective in taking wear in the joint. This fact has apparently not been appreciated by the ball joints shown in the prior art where the adjusting means reacts laterally, or perpendicular to the axis of the stud.

To provide an effective automatically adjustable ball joint, a comparatively large reactive force is required, which will not reverse under the reverse loading described. This result has been achieved in the disclosed embodiments of my invention in a compact, simple, and inexpensive design.

Figure 2:
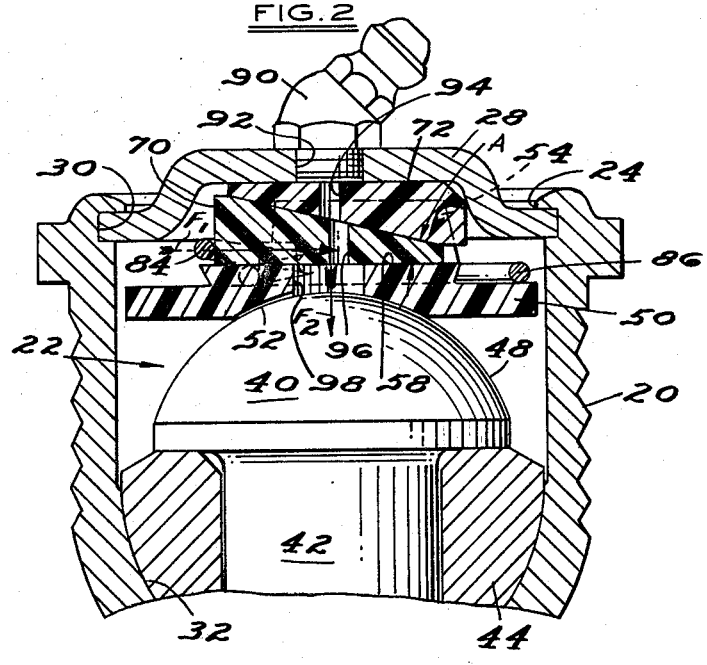
FIG. 2 is a cross-sectional side view of FIG. 1, in the direction of view arrows 2—2.

The wedge means is positioned in the axis of the stud to provide a substantially uniform downward force on the floating secondary bearing, while allowing for misalignment between the stud head and the bearing surfaces, such as might be caused by unequal wear, or initial misalignment as described previously. The comparatively large downward force asserted by the secondary bearing, and the "nonreversible" feature of the wedge bearing means is substantially the result of the small wedge angle A of the inclined surfaces, as shown in FIG. 2. The downward force $F_2$, which is the force asserted by the secondary bearing against the stud head, and the force $F_1$, which is the force asserted by the spring means against the shiftable wedge member, are related to the angle A by the following equation:

$$F_2/F_1 = \tan (\text{angle } A)$$

Thus, if the angle A is equal to 15 degrees, the resultant force $F_2$ will be equal to approximately four times the spring force $F_1$. Therefore, I have achieved a comparatively large resultant force with a relatively small spring means. I have also found that a small wedge angle, such as 15 degrees, will be "self locking," and therefore reverse loading will not tend to force the shiftable wedge member out of position.

Figure 3:
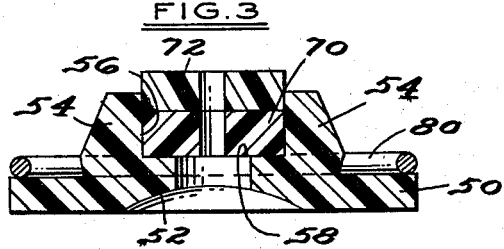
FIG. 3 is a cross-sectional view of the wedge bearing means of FIG. 1 in the direction of view arrows 3—3.

Referring specifically to the embodiments shown in FIGS. 1 to 3, wherein the housing 20 is provided with a stud-receiving socket 22 having a substantially cylindrical opening 24 and an opposed restricted opening. A housing cover 28 is received in a counterbore 30 in the housing wall, and may be spun in place as shown. The internal wall of the socket adjacent the restricted opening defines a spherically concave cannular bearing surface 32, which will be referred to as the primary bearing surface.

A stud is received within the housing socket having an enlarged head 40 and a shank portion 42 extending out of the restricted opening of the socket. An annular bearing element 44 is received beneath the enlarged head 40, which tilts and reacts with the enlarged head to function as a unitary stud head means. The lower portion of the stud head means is provided with a spherical bearing surface 46, which is received in bearing engagement with the primary bearing surface 32. The opposed surface of the stud head means 48 is also spherical, and is received within the secondary bearing surface 52, substantially opposite the stud shank 42.

The secondary bearing element 50 laterally floats within the housing socket 22, and is continuously and nonreversibly urged against the stud head means, as described hereinabove. In this embodiment the secondary bearing element 50 is provided with a pair of integral upstanding portions 54, which define a channel 56 therebetween for receiving the wedge members 70 and 72. The channel 56 defines a planar bearing surface 58, substantially perpendicular to the axis of the stud, which slideably engages the shiftable bearing element 70. The secondary bearing is also provided with a pair of integral upstanding posts 60, which receive and secure the coils 82 of the spring means 80.

The upper wedge member 72 is fixed within the housing cover, and the lower wedge member 70 shifts under the force of the spring means 80 into wedging engagement between the respective inclined faces of the wedge members, to urge the secondary bearing element against the stud bearing surface 48. The wedge members may be identical in structure, as shown, but are preferably made of different materials as herein described.

The spring means 80 may be formed from a single spring wire, and comprises a pair of torsion springs 84 each having a single coil 82 received on the bearing element posts 60. The coils are joined by an integral portion 86 which serves to balance the torsion springs 84, and provides for ease of assembly.

A lubrication channel may be provided which communicates with the socket 22. In this embodiment a zerk fitting 90 is threaded into a threaded opening 92 in the cover, and the apertures 94, 96 and 98 are provided in the fixed wedge member 72, the shiftable wedge member 70 and the secondary bearing 50 respectively.

The embodiment of FIGS. 4 to 6 is identical to the embodiment of FIGS. 1 to 3, except for the wedge means, and has been numbered herein accordingly.

The wedge means of this embodiment comprises a single shiftable wedge member 170, which is similar to the shiftable wedge member 70 of FIGS. 1 to 3, and an inclined internal face 130 of the housing cover 128, which functions the same as the inclined face of the wedge member 72 of FIGS. 1 to 3. The shiftable wedge member 170 is continuously and nonreversibly urged by the torsion springs 84 into wedging engagement between the planar surface of the secondary bearing element 58 and the inclined surface of the housing cover 130. The shiftable bearing element is also provided with an enlarged lubrication inlet 172 to provide communication between the zerk fitting 90 and the housing socket 22 on relative motion of the shiftable bearing.

The embodiment of FIGS. 7 to 9 is identical to the embodiment shown and described in FIGS. 1 to 3, except the wedge members 270 and 272 are provided with a groove or channel 274 and a tongue 276, respectively, to guide the shiftable wedge member 270. The tongue and groove of this embodiment serve the same function as the channel 56 defined in the secondary bearing element of FIGS. 1 to 3, and therefore a channel is not provided on the secondary bearing element 250 of this embodiment.

What is claimed is:

1. A self-adjusting tension loaded ball joint, comprising: a housing defining a socket having an open end and an annular spherically curved bearing surface adjacent said open end, a load transmitting stud provided with an enlarged head means in bearing engagement with said bearing surface and a shank extending out of the socket open end, said enlarged head having at least a partially spherically curved bearing surface opposite said shank, a laterally floating bearing element disposed within said housing having a spherically concave bearing surface opposed to the socket open end and an opposed planar surface substantially normal to the longitudinal axis of said housing socket, said bearing element shiftable in substantially the axis of said shank for bearing engagement with said enlarged head, a wedge means disposed between said bearing element and an opposed wall of the socket in sliding engagement with said planar surface wedgingly shiftable in relation to said bearing element to continuously urge said bearing element into bearing engagement with said enlarged head, and a spring means carried by said floating bearing element shiftable therewith and reactant thereagainst, said spring means tensioned against said wedge means to continuously urge said wedge means in the aforesaid wedging motion.

2. The self-adjusting tension loaded ball joint defined in claim 1, wherein said wedge means comprises a wedge member having a planar surface in sliding engagement with said bearing element and an opposed angularly inclined surface wedgingly engaged with a complementary angularly inclined surface of said device.

3. The self-adjusting tension loaded ball joint of claim 2, wherein said floating bearing element is provided with a channel configured to receive said planar surface of said wedge member to guide the aforesaid sliding engagement.

4. The self-adjusting tension loaded ball joint of claim 1, wherein said wedge means comprises a pair of complementary wedge members each having a planar surface and an opposed angularly inclined surface, the planar surface of one of said wedge members engaging said opposed wall of the socket, and the other of said wedge members shiftably urged by said spring means to wedgingly engage the complementary angularly inclined surfaces.

5. The self-adjusting tension loaded ball joint of claim 4, wherein the pitch angle of said angularly inclined surfaces is self-locking so that the shiftable wedge member is nonreversibly urged into wedging engagement with the other of said wedge members.

6. The self-adjusting tension loaded ball joint of claim 4, wherein one of the complementary angularly inclined surfaces of said wedge members is provided with a channel which receives a projecting portion of the other of said wedge members to guide the wedging motion therebetween.

7. The self-adjusting tension loaded ball joint defined in claim 1, wherein the spring means comprises a pair of balance single coil torsion springs.

8. The self-adjusting tension loaded ball joint defined in claim 7, wherein said torsion springs have extending portions joined to define an integral spring means.

9. The self-adjusting tension loaded ball joint defined in claim 7, wherein said bearing element has a pair of posts, and said spring coils are received on said posts.

References Cited
UNITED STATES PATENTS

| | | | |
|---|---|---|---|
| 1,474,354 | 11/1923 | Franchi | 287—877 XR |
| 1,650,629 | 11/1927 | Johnson. | |
| 1,663,582 | 3/1928 | Bonney | 308—68 |
| 1,966,781 | 7/1934 | Wyrick. | |
| 2,318,507 | 5/1943 | Martin | 308—66 |
| 2,539,186 | 1/1951 | French. | |
| 2,972,496 | 2/1961 | Herbenar et al. | |

EDWARD C. ALLEN, *Primary Examiner.*

A. V. KUNDRAT, *Assistant Examiner.*